(12) United States Patent
Baladhandapani et al.

(10) Patent No.: US 12,512,796 B2
(45) Date of Patent: Dec. 30, 2025

(54) BIAS BLOCK FOR BIASING TRANSISTORS EXHIBITING NON-LINEARITY WHEN DESIGNED FOR LINEAR OPERATION

(71) Applicants: Shaoxing Yuanfang Semiconductor Co., Ltd., Shaoxing (CN); Spirit Semiconductor Limited, Reading (GB)

(72) Inventors: Nigesh Baladhandapani, Bangalore (IN); Gopikrishna Reddy Gudibandla, Bangalore (IN); Sandeep Mallya Perdoor, Bangalore (IN)

(73) Assignees: Shaoxing Yuanfang Semiconductor Co., Ltd., Shaoxing (CN); Spirit Semiconductor Limited, Reading (GB)

( * ) Notice: Subject to any disclaimer, the term of this patent is extended or adjusted under 35 U.S.C. 154(b) by 496 days.

(21) Appl. No.: 18/156,395

(22) Filed: Jan. 19, 2023

(65) Prior Publication Data
US 2024/0048104 A1 Feb. 8, 2024

(30) Foreign Application Priority Data
Aug. 3, 2022 (IN) .............................. 202241044467

(51) Int. Cl.
*H03F 1/30* (2006.01)
*H03F 1/32* (2006.01)
(Continued)

(52) U.S. Cl.
CPC ............. *H03F 1/3205* (2013.01); *H03F 3/21* (2013.01); *H04B 1/40* (2013.01);
(Continued)

(58) Field of Classification Search
CPC ................ H03F 1/30; H03F 3/20; H03G 3/30
(Continued)

(56) References Cited

U.S. PATENT DOCUMENTS 6,424,225 B1 7/2002 Choi et al.
6,911,861 B2 6/2005 Deng
(Continued)

FOREIGN PATENT DOCUMENTS

CA 2351327 C 6/2000
CN 101944883 A 1/2011
(Continued)

OTHER PUBLICATIONS

International Search Report dated Dec. 25, 2023, for PCT Application No. PCT/IN2023/050749, filed on Aug. 2, 2023, 4 pages.
(Continued)

*Primary Examiner* — Henry Choe
(74) *Attorney, Agent, or Firm* — IPHORIZONS PLLC; Narendra Reddy Thappeta (57) ABSTRACT

A bias block for providing a bias voltage includes a transistor having a control terminal, a first current terminal and a second current terminal. A voltage level at the control terminal determines a magnitude of current flowing between the first current terminal and the second current terminal. The first current terminal is coupled to a supply voltage via a first impedance and the second current terminal is coupled to a constant reference potential via a second impedance. The second current terminal provides the bias voltage. The bias block further includes a capacitor coupled between the control terminal and the second current terminal of the transistor.

19 Claims, 5 Drawing Sheets

(51) Int. Cl.
    *H03F 3/21*     (2006.01)
    *H04B 1/40*     (2015.01)
    *H04L 5/14*     (2006.01)

(52) U.S. Cl.
    CPC .. *H03F 2200/294* (2013.01); *H03F 2200/451* (2013.01); *H04L 5/14* (2013.01)

(58) Field of Classification Search
    USPC .................................................. 330/296, 285
    See application file for complete search history.

(56) References Cited

U.S. PATENT DOCUMENTS

| | | | |
|---|---|---|---|
| 7,230,493 | B2 | 6/2007 | Kokubo |
| 8,593,224 | B1 | 11/2013 | Yuen et al. |
| 8,917,144 | B2 * | 12/2014 | Iyomasa ............... H03F 3/60 330/285 |
| 8,928,412 | B2 * | 1/2015 | Liou ............... H03F 1/302 330/296 |
| 11,281,245 | B1 | 3/2022 | Joly |
| 2008/0278220 | A1 * | 11/2008 | Taylor ............... H03F 1/3205 327/535 |
| 2009/0160558 | A1 | 6/2009 | Choi et al. |
| 2012/0306579 | A1 * | 12/2012 | Okamura ............... H03F 1/0261 330/296 |
| 2014/0368277 | A1 * | 12/2014 | Ding ............... H03F 1/0261 330/296 |
| 2018/0054166 | A1 | 2/2018 | Pehlivanoglu |

FOREIGN PATENT DOCUMENTS

| | | |
|---|---|---|
| CN | 104426486 A | 3/2015 |
| CN | 105048969 B | 11/2015 |
| CN | 209375591 U | 9/2019 |
| CN | 112994629 A | 6/2021 |
| WO | WO2019152326 A1 | 8/2019 |

OTHER PUBLICATIONS

Written Opinion of the International Searching Authority dated Dec. 25, 2023, for PCT Application No. PCT/IN2023/050749, filed on Aug. 2, 2023, 6 pages.

Shaohua Zhou, et al, An Experimental Investigation of the Degradation of CMOS Low-Noise Amplifier Specifications at Different Temperatures, Aug. 6, 2022, Micromachines. China.

Shintaro Shinjo, et al, On-chip temperature compensation active bias circuit having tunable temperature slope for GaAs FET MMIC PA, Oct. 2011, 01 page, vol. E94.C, IEICE Transactions on Electronics.

Shaohua Zhou, et al, On-Chip Temperature Compensation for Small-Signal Gain Variation Reduction, Jul. 13, 2022, 12 pages Micromachines. China.

K.W. Kobayashi, et al, A monolithic DC temperature compensation bias scheme for multistage HEMT integrated circuits, journal, Feb. 2, 1996, pp. 261-268, vol. 44, IEEE, USA.

Julian Rosu, Bias Circuits for RF Devices, Oct. 18, 2022, 25 pages.

GaN HEMT Bias Sequencing and Temperature Compensation Circuit, Jan. 2, 2020, , 06 pages, Durham, NC.

Johan Bremer, Compensation of Thermal Effects by Dynamic Bias in Low Noise Amplifiers, thesis, 2017, 74 Pages, Sweden.

Lalithalakshmi.R, et al, Design of Low Noise Amplifier (LNA) With Low Power using Predistortion Technique, Mar. 2018, 03 pages, India.

W. Zhuo, et al, A capacitor cross-coupled common-gate low-noise amplifier, Dec. 12, 2005, 05 pages, IEEE.

Ram Kumar, et al, A low noise amplifier with improved linearity and high gain, Sep. 28, 2022, 06 pages, India.

Alexander Alt, Supply Modulated GaN HEMT Power Amplifiers—From Transistor to System, Thesis, Jul. 11, 2021, 278 pages, Cardiff University.

\* cited by examiner

BIAS BLOCK FOR BIASING TRANSISTORS EXHIBITING NON-LINEARITY WHEN DESIGNED FOR LINEAR OPERATION

PRIORITY CLAIM

The instant patent application is related to and claims priority from the co-pending provisional India patent application entitled, "Process and Temperature-compensated bias block with non-linearity cancellation", Serial No.: 202241044467, Filed: 3 Aug. 2022, which is incorporated in its entirety herewith to the extent not inconsistent with the description herein.

BACKGROUND

Technical Field

Embodiments of the present disclosure relate generally to a bias block, and more specifically to a bias block for biasing transistors exhibiting non-linearity when designed for linear operation.

Related Art

Transistors are often employed to provide linear operations. A common example of such operation is amplification when the transistor operates in a "linear mode operation region" (e.g., 'saturation region' for Field Effect Transistors (JFET, MOSFET, etc.), and 'active region' for Bipolar Junction Transistors (BJT)), as is well known in the relevant arts.

Transistors require biasing when employed for linear mode operation. Biasing refers to setting up an operating point for transistors for such operation, as is also well known in the relevant arts. The operating point is generally defined by a corresponding bias voltage. A "linear mode operation region" is a desired ideal characteristic in the operation of transistors, but which practically contain non-linearity, which results in the distortion of the generated output signal. The impact of such non-linearity is significantly less than the ideal linearity that the transistor provides in generating the overall output signal. As an example of the 'extent' of non-linearity, an output signal obtained from a pure single-tone signal provided as input to the transistor, may contain spurious components (overtones) having a magnitude 15-20 decibels (dB) below that of the fundamental signal component corresponding to the ideal pure single-tone output.

Aspects of the present disclosure are directed to bias blocks for biasing transistors exhibiting such non-linearity when designed for linear operation.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, a bias block for providing a bias voltage includes a transistor having a control terminal, a first current terminal and a second current terminal. A voltage level at the control terminal determines a magnitude of current flowing between the first current terminal and the second current terminal. The first current terminal is coupled to a supply voltage via a first impedance and the second current terminal is coupled to a constant reference potential via a second impedance. The second current terminal provides the bias voltage.

The bias block further includes a capacitor coupled between the control terminal and the second current terminal of the transistor. The capacitor enables the bias block to present high impedance to a high-frequency signal applied at said junction. Providing of the bias voltage at the second current terminal enables the bias block to present a low impedance at DC at the junction.

According to another aspect of the present disclosure, the capacitor has a capacitance value that enables pre-distortion of a signal applied at the junction, the pre-distortion being designed to cancel non-linearity of a circuit when the circuit is biased by the bias voltage.

In an embodiment, the transistor of the bias block is a pseudo High Electron Mobility Transistor (pHEMT).

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Circuit/Device

Figure 1:
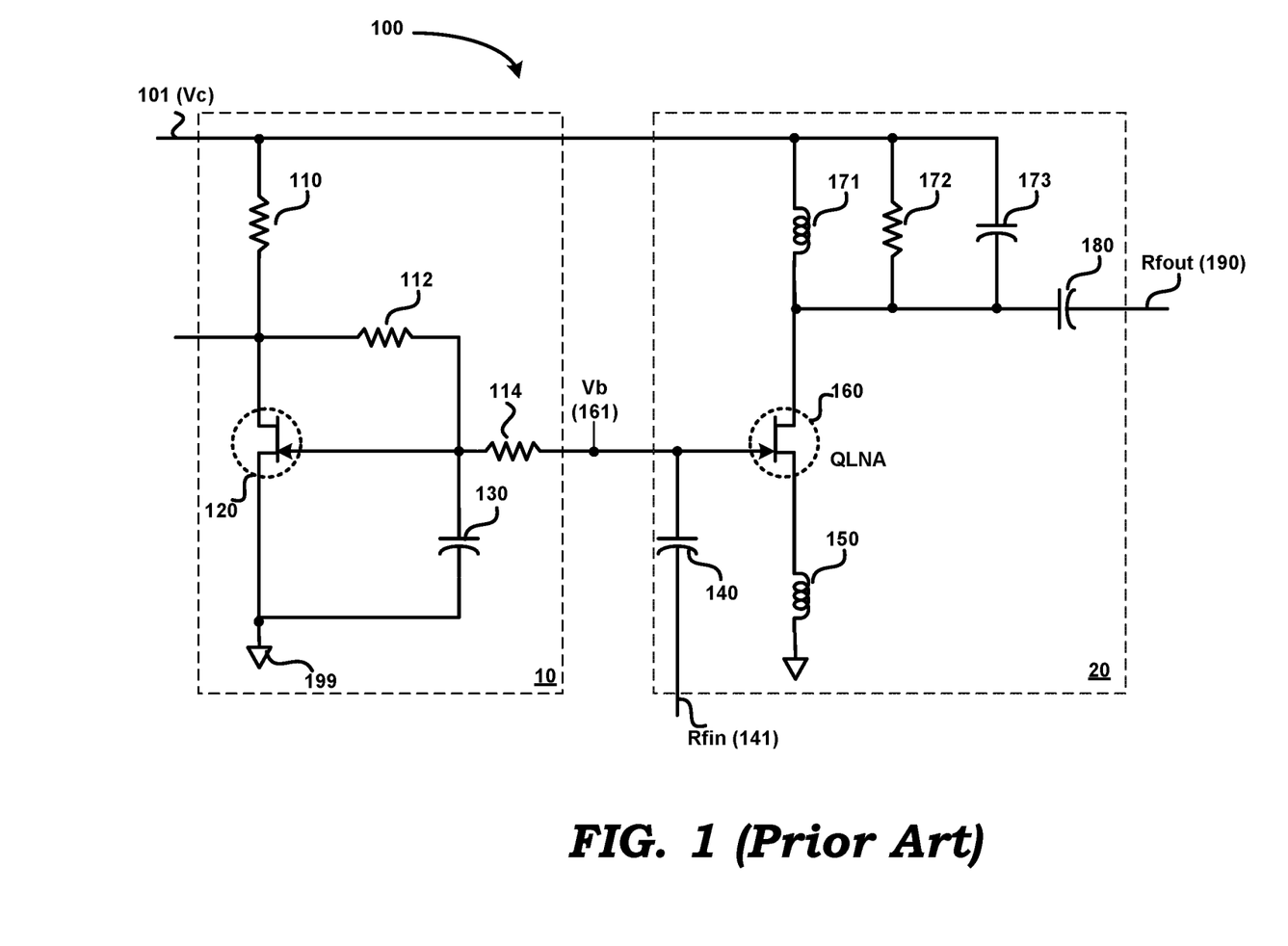
FIG. 1 is a block diagram of an example circuit in which several aspects of the present disclosure can be implemented.

FIG. 1 is a block diagram of an example circuit which can be extended according to several aspects of the present disclosure. Circuit 100 is shown containing prior bias block 10 and low-noise amplifier (LNA) 20. The specific details of LNA 20 are shown merely by way of illustration. LNA 20 can also be implemented differently as would be apparent to one skilled in the relevant arts. Further, an LNA is just one example circuit which can employ a bias block implemented according to aspects of the present disclosure. In general, any circuit or block/device that contains one or more transistors that need to operate in a linear mode can be used in place of an LNA in alternative embodiments according to additional aspects of the present disclosure.

In the description provided below, the transistors shown and described are pseudomorphic-High Electron Mobility Transistors (pHEMT), also known as heterostructure FET (HFET) or modulation-doped FET (MODFET) which may be implemented as junction field-effect transistors (JFET), and the circuits/blocks using such transistors are shown as radio-frequency (RF) circuits used in wireless communications. As is well-known in the relevant arts, pHEMT transistors employ two materials with different band gaps (i.e., a heterojunction) to form a junction that acts as the channel for current flow. Commonly used material combinations for pHEMTs include Gallium Arsenide (GaAs) and Aluminum Gallium Arsenide (AlGaAs). In the specific embodiments described herein, all transistors are enhancement-mode pHEMTs (indicated in the figures by the symbol normally used for n-channel JFETs). However, other types of transistors (including depletion-mode ones), as noted in sections below, can instead be used also according to aspects of the present disclosure.

LNA 20, which may be a circuit/block (located immediately after the antenna) in a receiver chain of a wireless or wired receiver, operates to amplify the received input signal with minimal or no addition of noise. With respect to LNA 20, signal 141 (RFin) represents a received radio-frequency (RF) signal that is to be amplified. LNA 20 is shown containing DC-blocking capacitor 140, pHEMT transistor 160, inductor 150, inductor 171, resistor 172, capacitor 173 and DC-blocking capacitor 180. Inductor 150 is used for improving the noise-performance of LNA 20. A resistor of suitable resistance value can also be used in place of inductor 150. Vc (101) represents a power supply voltage, and node 199 a ground terminal. The combination of components 171, 172 and 173 together form a load that sets the pass-band of LNA 20 (typically same as the signal band of RFin). RFout (190) is the amplified output of LNA 20.

A bias voltage is required for linear operation of transistor 160. Various aspects of the present disclosure may be better understood when compared with the drawbacks of a prior bias block, which is briefly described next.

Bias voltage Vb (161) is generated by prior bias block 10, which is shown containing pHEMT transistor 120, resistors 110, 112 and 114, and bypass capacitor 130. Transistor 120 is configured as a diode-connected transistor. The values of resistors 110 and 120 determine the voltage at the gate terminal of transistor 120, which due to the configuration of transistor 120 is usually slightly larger than the threshold voltage (Vth) of transistor 120. Resistor 112 serves to limit current consumption when the gate node of transistor 120 is pulled to ground (via a switch, not shown) to set circuit 100 to a 'sleep', 'standby', or low-power mode. Resistor 114 is implemented to have a large resistance to isolate bias block 10 from RFin (141) by preventing or minimizing flow/leakage of Rfin into bias block 10. In general, at least for an LNA, the resistance of resistor 114 may need to be high enough so that its contribution to the noise-figure (NF) is less compared to that of the LNA. Assuming, zero gate current in transistor 160 (QLNA), the gate voltage of transistor 160 would equal the gate voltage of transistor 120. Bypass capacitor 130 is used to minimize (high-frequency) fluctuations in the gate voltage of transistor 120.

One disadvantage associated with prior bias block 10 is that any gate-leakage current of QLNA would cause a significant voltage drop across resistor 114. As a result, the gate voltage of QLNA (same as Vb, assuming DC conditions only) would be less than that of the gate voltage of transistor 120. Furthermore, the leakage current of QLNA varies with operating temperature. This may result in variations in the magnitude of vb, thereby resulting in higher variation in performance of LNA 20 across temperature as the leakage current varies. The variation in the leakage current is typically difficult to model, and therefore difficult to compensate for.

Bias voltage Vb varies due to temperature-variation effects on transistor 120 also, for example, due to temperature-induced changes to threshold voltage of transistor 120.

Variations in Vb as noted above generally result in distortions in RFout generated by LNA 20.

Additionally, the inherent non-linearity of LNA 20 itself may be another source of distortion in RFout.

A bias block implemented according to several aspects of the present disclosure reduces or eliminates the above noted problems, as is described next.

3. Bias Block

Figure 2:
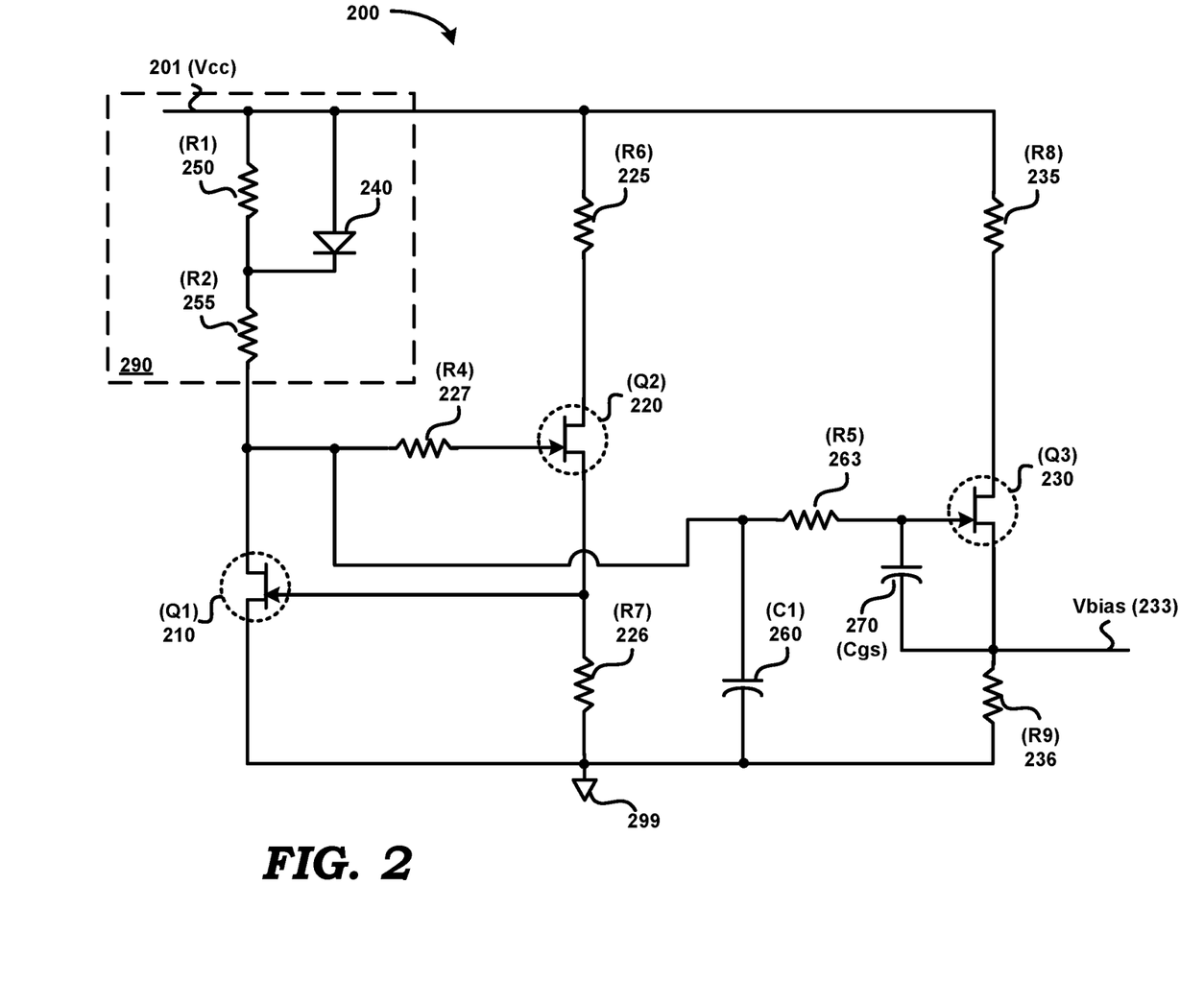
FIG. 2 is a circuit diagram illustrating the implementation details of a bias block in an embodiment of the present disclosure.

FIG. 2 is a circuit diagram illustrating the implementation details of a bias block in an embodiment of the present disclosure. Bias block 200 is shown containing resistors 250 (R1), 255 (R2), 227 (R4), 263 (R5), 225 (R6), 226 (R7), 235 (R8) and 236 (R9), pHEMT transistors 210 (Q1), 220 (Q2) and 230 (Q3), diode 240 and capacitors 260 (C1) and 270 (Cgs). Vcc (201) represents a power supply voltage, and node 299 a ground terminal. Bias voltage Vbias (233) is provided at the source terminal of Q3.

The series combination of R1 and R2 is connected between Vcc and drain terminal of Q1. Diode 240 is connected in parallel with R1. The anode terminal of diode 240 is connected to Vcc, and the cathode terminal of diode 240 is connected to the junction of R1 and R2. The drain of Q1 is connected via R4 to the gate of Q2. The source of Q1 is connected to ground. Resistor R7 is connected between the source terminal of Q2 and ground. The source terminal of Q2 is connected to gate of Q1. Resistor R6 is connected between the drain of Q2 and Vcc.

Capacitor C1 is connected between drain of Q1 and ground. Resistor R5 is connected between drain of Q1 and gate of Q3. Resistor R8 is connected between drain of Q3 and Vcc. Resistor R9 is connected between source of Q3 and ground. Capacitor Cgs is connected between gate and source of Q3. The source of Q3 provides bias voltage Vbias (233).

In bias block 200, instead of providing Vbias from the gate of Q1 (as in prior bias block 10 of FIG. 1), the drain of Q1 is connected to gate of Q3, and Vbias (233) is provided at source of Q3. In effect, the voltage at gate of Q1 is 'stepped-up' by connecting drain of Q1 to gate of Q3 (via R5). The voltage at gate of Q3 is then 'stepped-down' by the same magnitude as that by which the voltage at gate of Q1 was 'stepped-up'. Ideally, it may be desirable that the magnitude of the stepping-up be substantially equal to that of the stepping-down. Hence, the operating point or operating conditions of transistors Q2 and Q3 may need to be substantially the same.

To ensure such a condition, resistance values of resistor pairs 227 and 263, 225 and 235, and 226 and 236 are chosen accordingly. For example, the resistance values of resistor 227 and resistor 263 may be chosen to be substantially equal, resistance values of resistor 225 and resistor 235 may be chosen to be substantially equal, and resistance values of resistor 226 and resistor 236 may be chosen to be substantially equal. Transistors Q2 and Q3 may also be matched transistors. As a result, the voltage Vbias (233) substantially equals the gate voltage of Q1. However, it may be appreciated that as Vbias is now provided at the source terminal of Q3, the Vbias node presents a low-impedance at DC (0 Hertz), as described further below. The use of Cgs causes the impedance (looking-in impedance) at Vbias to be high at RF, as described below.

C1 provides high-frequency noise filtering. Cgs enables bias block 200 to provide a high impedance at RF, while also helping to cancel the non-linearity of a device/circuit such as an LNA connected to receive Vbias for biasing a transistor of the device/circuit.

The specific structure of bias block 200 enables Vbias (233) to be a temperature-compensated stable voltage. Bias block 200 provides low impedance at DC (0 hertz), a high impedance at high frequencies (RF) (without the use of a large-valued resistor such as resistor 114 of prior bias block 10) and can provide the additional current required by the gate (due to gate leakage) of a pHEMT transistor (e.g., of an LNA) that is biased by Vbias.

Additionally, the use of Cgs also tunes the non-linear impedance presented to Vbias node 233 (for example by a pHEMT transistor of an LNA as in FIG. 1) and thus enables cancellation of the inherent non-linearity of the LNA (not shown in FIG. 2, but which can be the same as LNA 20 of FIG. 1), thereby achieving better LNA linearity. To ensure such cancellation, capacitance of Cgs cap needs to be non-linear in such a manner as to counter (mitigate or cancel) the inherent non-linearity of the LNA. In an embodiment of the present disclosure, such a non-linear capacitance is achieved by implementing Cgs as a reverse-biased diode using another pHEMT transistor constructed appropriately. As is well-known in the relevant arts, a reverse-biased diode exhibits a capacitance that is dependent on the voltage across the reverse-biased diode. However, other implementations for Cgs can also be used instead.

The manner in which the advantages noted above are obtained by bias block 200 is described next.

4. Low Impedance at DC and High Impedance at RF

Bias block 200 provides a low impedance at DC and a high impedance at RF. Specifically, the high0impedance at RF is at least partially enabled by the use of Cgs across gate and source nodes of Q3.

Figure 3:
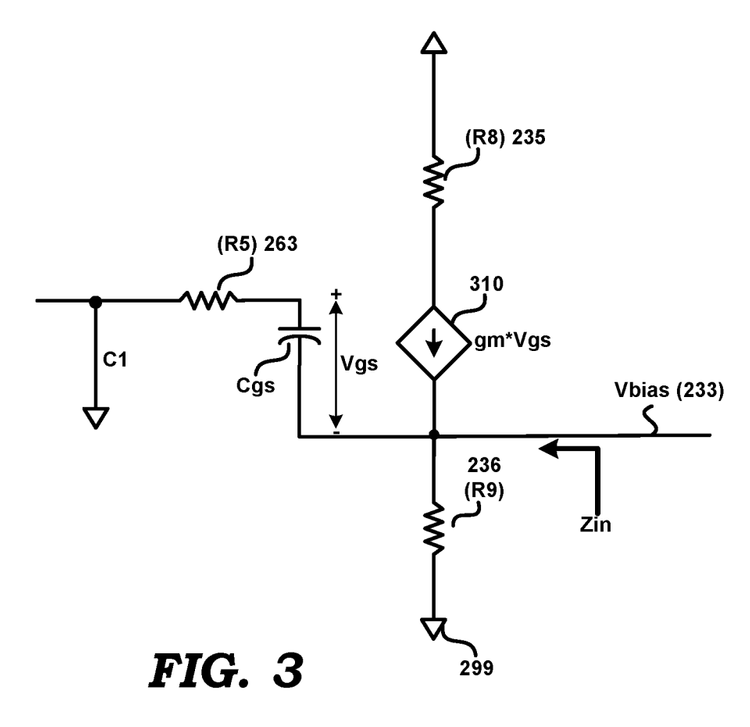
FIG. 3 is a diagram of the relevant portions of a bias block in an embodiment of the present disclosure, and is used to illustrate determination of the looking-in impedance (under various conditions) at the node that provides the bias voltage.

FIG. 3 is a diagram of the relevant portions of bias block 200 that is used for determining the impedance (i.e., looking-in impedance at the source terminal of Q3) presented by bias block 200 to an external signal (not shown, but which could be an RF input signal of an LNA biased by bias block 200. Transistor Q3 of bias block 200 is shown replaced by its equivalent circuit model. For high frequencies (RF), capacitors can be replaced by shorts, and hence at RF, C1 would be a short to ground, as shown in FIG. 3. Vgs is the gate-to-source voltage of Q3. Gm is the transconductance of Q3. At RF, Cgs is a short, and therefore, Vgs would be zero. Current source 310 generates a current of magnitude gm*Vgs. The looking-in impedance Zin at Vbias node can be expressed by the following relation:

$$Zin = R9 \| R5 \| ((1/gm) + R8)) \quad \text{Equation 1}$$

wherein,
the symbol $\|$ represents an 'in-parallel with' operation,
1/gm is the impedance due to component 310.

Since Vgs=0 at RF due to capacitor Cgs, 1/gm reduce to 0.

Therefore, $$Zin = R9 \| R5 \| R8 \quad \text{Equation 2}$$

R8 and R5 are typically large-valued resistors. R9 would normally be implemented to have a much smaller resistance value when compared with resistances of R8 and R5, and thus would be the dominant factor that determines Zin as noted above in Equation 2. By deliberately choosing R9 to have a sufficiently large value (while still obtaining the appropriate/desired value of the current through transistor Q3), Zin of Equation 2 can be made to be a large impedance.

At DC, the looking-in impedance Zin approximately equals 0, or a very small value, since the (1/gm) component of Zin as noted in Equation 1 above would be very nearly 0 (gm being typically a very high value.).

Thus, Zin is very large at RF and very small at DC.

As a result, at RF, bias block 200 presents a large impedance to a signal applied at Vbias. In the context of an LNA (connected to Vbias in a manner similar to that shown in FIG. 1), the RF signal applied at Vbias would 'see' a high looking-in impedance Zin, and would therefore not leak into the bias block, thereby not affecting the magnitude of Vbias (233). Further, bias block 200 achieves such effect without the use of a large-valued resistor such as resistor 114 of prior bias block 10.

Further, any gate-leakage current of the transistor (of an LNA for example) with its gate connected to Vbias, can be provided by bias block 200 (due to the low impedance at DC) without resulting in much variation in the magnitude of Vbias. Further, since the variation in Vbias is zero or very small, temperature-related variations of the gate-leakage current would not result in much variation in performance of an LNA across temperature as the leakage current varies.

The manner in which bias block 200 can enable cancellation or minimization of the non-linear effects of a device/circuit (such as an LNA) connected to it is described next.

4. Non-Linearity Cancellation

According to another aspect of the present disclosure, bias block 200 can be tuned to minimize or cancel the non-linearity of a device/circuit (such as an LNA) biased by Vbias. Specifically, the use of Cgs enables pre-distortion that can be used to cancel the inherent non-linearity of the device/circuit, thereby achieving better linearity.

Figure 4:
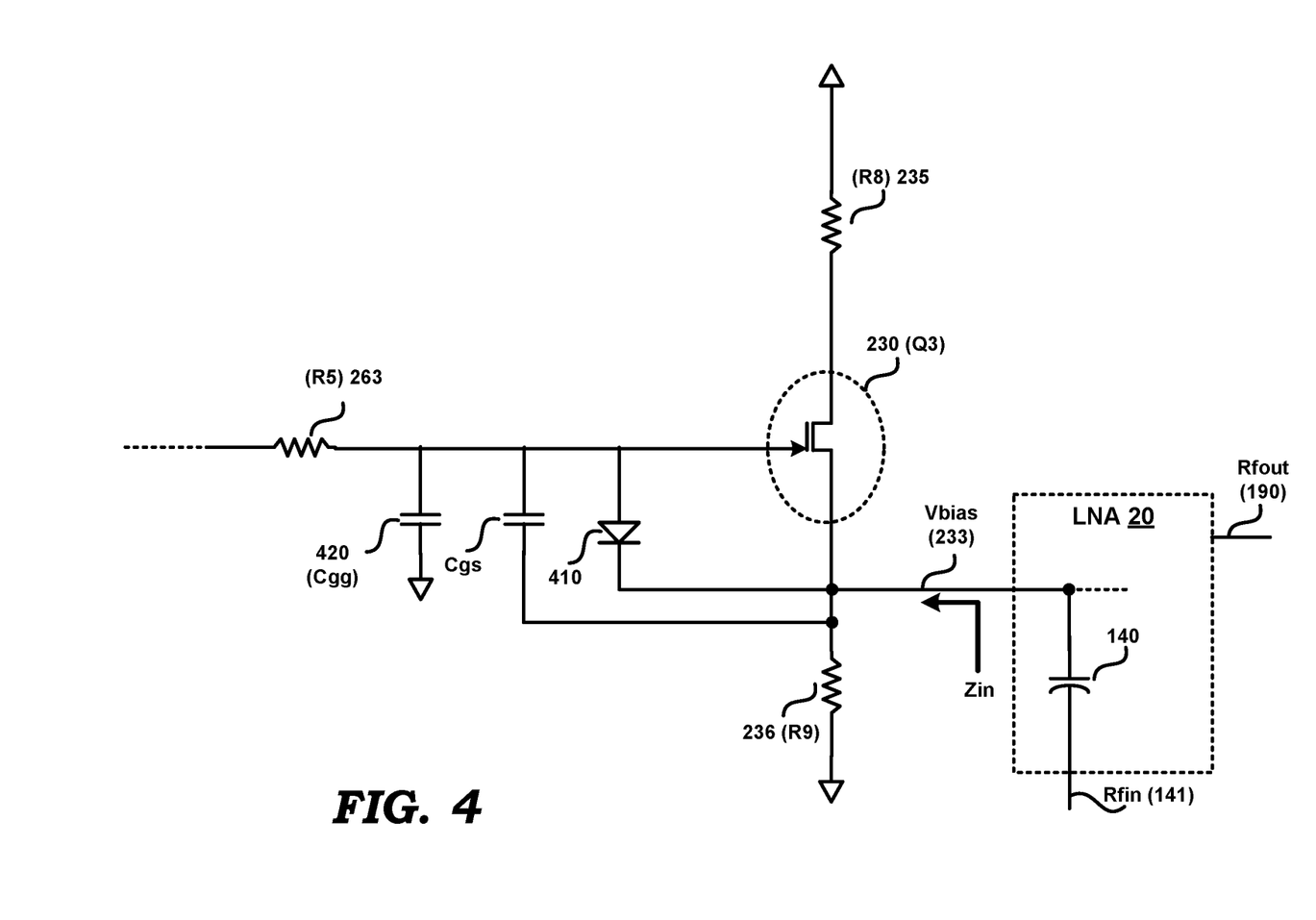
FIG. 4 is a diagram of a portion of a bias block in an embodiment of the present disclosure, and is used to illustrate cancellation of non-linearities of a device/circuit employing the bias block.

FIG. 4 is a diagram of a portion of bias block 200. LNA 20 of FIG. 1 is also shown. In the portion of bias block 200 shown, in addition to R5, R8, R9 and Cgs (which are the same as in FIG. 2), a parasitic gate-to-ground capacitor Cgg (420) and the internal (i.e., intrinsic) gate-to-source diode 410 of Q3 are also shown. Cgg and diode 410 are not additional components added to bias block 200, but are inherently present as a parasitic capacitor and the diode formed by the gate and source of Q3 respectively.

It can be shown that at high-frequencies (and with the resistance of R9 set to high value), the looking-in impedance Zin at the Vbias node (233) is expressed by the following equation:

$$Zin = (1/gm) * [(Cd + Cgs + Cgg)/Cgg] \quad \text{Equation 4}$$

wherein,
gm is the transconductance of Q3,
Cd is the capacitance of the reverse-biased (below the knee-voltage or breakdown voltage) gate-source diode represented externally by diode 410, Cgg is the gate-to-ground parasitic capacitance across gate of Q3 and ground, and '*' represents a multiplication operation.

Cd, being the capacitance of a diode (and in particular of a reverse-biased diode), will vary in a non-linear fashion with respect to changes in the voltage across the diode, as is well known. The application of Rfin (141) to LNA 20 (now biased with Vbias) changes the voltage across the diode, thereby causing Cd, and therefore Zin, to vary correspondingly in a non-linear fashion. This property is exploited to cancel or minimize the inherent non-linearity of LNA 20. It is noted here that Cd alone is typically too small to cancel the non-linearity by itself, even though capacitance of Cd is what varies with changes in the voltage at Vbias node. Therefore, capacitance of Cgs is chosen to enable cancelation. That is to say that the capacitance of (Cd+Cgs) varies (due to changes in Cd), such that the variation of (Cd+Cgs) is at a range required to cancel non-linearity of LNA 20.

To determine the capacitance value of Cgs needed for the cancellation, the characteristics and extent of non-linearity of LNA 20 is determined in a known way. The magnitude of capacitance of Cgs is then determined such that (Cd+Cgs) causes Zin to vary (due to Cd) so as to cancel or minimize the non-linearity. Such determination can be made, for example, using circuit simulations or any other appropriate technique. Cgs is implemented in bias block 200 to have the determined capacitance. As a result, Zin is caused to vary by Rfin in a manner so as to cause the voltage provided as input to LNA 20 (i.e., voltage at Vbias) to be deliberately pre-distorted to an extent required for cancelling or minimizing the non-linearity due to LNA 20. As a result, the relation between Rfout and Rfin can be rendered substantially linear.

It may be appreciated from the description above that providing Vbias at the source of Q3 in combination with the use of Cgs allows the cancellation of non-linearity of device/circuit biased by bias block 200.

According to yet another aspect of the present disclosure, bias block 200 has built-in temperature compensation, and is described next.

5. Built-in Temperature Compensation

The use of diode 240, R1 and R2 enables Vbias (233) to be compensated (or corrected) for temperature variations. Referring to FIG. 2, it was noted above that the magnitude of Vbias (233) substantially equals the voltage at gate of Q1. As the operating (ambient) temperature increases, the threshold voltage Vth of a pHEMT transistor (or an FET in general) decreases, thereby causing Vbias to decrease (the magnitude of Vbias being the same as the voltage (Vth) at gate of Q1). Therefore, a temperature compensation mechanism is needed such that Vbias remains substantially constant despite temperature changes.

As temperature increases, current-voltage (I-V) relationship curve of forward-biased diode 240 shifts leftwards, as is well known in the relevant arts. Therefore, the voltage (Vf) across diode 240 reduces, thereby increasing the voltage at drain terminal of Q1. As a result, the gate voltage of Q1, and therefore Vbias (233) increase correspondingly to compensate for the reduction in Vbias that would otherwise have occurred due to increase in temperature had temperature compensation not been provided. Therefore, Vbias remains constant despite temperature variations. The resistances of R1 and R2 are selected such that the precise extent of compensation for temperature changes occurs to keep Vbias (233) constant. The combination of R1, R2 and diode 240 may be viewed as temperature-compensation block 290.

Bias block 200 implemented as described above can be incorporated in one or more devices of a system as described briefly next.

6. System

Figure 5:
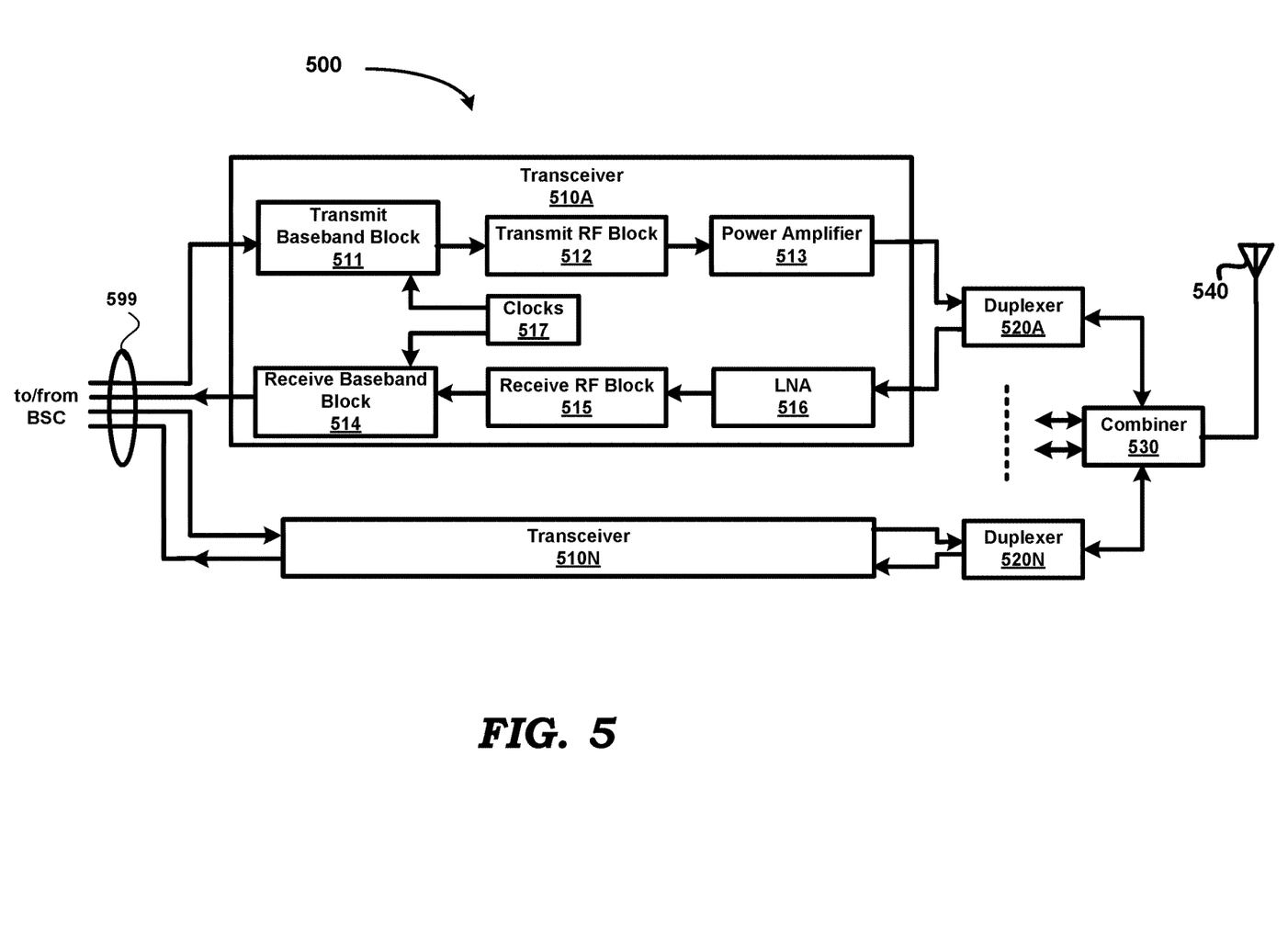
FIG. 5 is a block diagram illustrating the implementation details of a system incorporating one or more devices that employ one or more bias blocks implemented according to several aspects of the present disclosure.

FIG. 5 is a block diagram illustrating the implementation details of a system incorporating one or more devices that employ one or more bias blocks such as bias block 200 described above. In the example of FIG. 5, RF devices such as LNA 516, receive RF block 515, transmit RF block 512 and power amplifier 513 can be implemented to employ bias block 200 for biasing corresponding transistors (e.g., implemented as pHEMT or other types noted above) therein.

The system of FIG. 5 may be deployed in a Base Transceiver Station (BTS) (eNodeB in LTE-Long Term Evolution) of a cellular telephony system, and is referred to herein as BTS system 500. Broadly, BTS system 500 facilitates wireless communication between user equipment (UE) that may be mobile stations (e.g., cell phones) or fixed user equipment such as computers with internet connectivity. BTS system 500 may be implemented consistent with technologies and standards such as GSM, CDMA, 3G, 4G, LTE, 5G, etc. BTS system 500 is shown containing transceivers 510A through 510N, duplexers 520A through 520N, combiner 530 and antenna 540. The specific components/blocks of BTS system 500 are shown merely by way of illustration. However, typically BTS system 500 may contain more components/blocks, such as temperature sensors, maintenance and configuration blocks, etc., as is well-known in the relevant arts.

Each of transceivers 510A through 510N operates to transmit and receive communication signals to/from wireless user equipment via the corresponding duplexer 520A-520N, combiner 530 and antenna 540. Each of the transceivers contains a transmitter portion and a receiver portion. Thus, transceiver 510A is shown containing a transmitter portion that includes transmit baseband block 511, transmit RF block 512 and power amplifier 513, and a receiver portion that includes low-noise amplifier (LNA) 516, receive RF block 515 and receive baseband block 514.

Transmit baseband block 511 receives information signals (e.g., representing voice, data) from a base station controller (BSC) (which in turn receives the communication signals from another user equipment (wireless or fixed) in the network downstream of the BSC) via the corresponding path shown in bus 599, processes the signals according to the corresponding technology and protocols to perform modulation, channel coding and other operations, and forwards the processed signals to transmit RF block 512. Transmit RF block 512 may perform operations such as up-conversion to RF (Radio Frequency), and forwards the RF signals to power amplifier 513. Power amplifier 513 amplifies the received RF signals and transmits the power-amplified signals via duplexer 520A, combiner 530 and antenna 540 to corresponding wireless user equipment.

LNA 516 may be implemented as LNA 20 (shown in FIG. 1, and further extended per disclosure above) and may employ bias block 200 as shown and described above. LNA 516 receives an RF signal from a wireless user equipment via duplexer 520A, combiner 530 and antenna 540, amplifies the RF signal, and forwards the amplified RF signal to receive RF block 515. Receive RF block 515 down-converts the RF signal to baseband frequency and forwards the baseband signal to receive baseband block 514. Receive baseband block 514 may perform operations such as demodulation, error correction, etc., on the baseband signals to obtain the information signal (e.g., data, voice) and forwards the information signal to BSC via the corresponding path in bus 599.

Clocks 517 generates one or more clocks required to enable operation of digital units in transceiver 510. For example, transmit baseband block 511 and receive baseband block 514 may internally contain one or more processors that require clocks to enable their operation.

The transmitters, receivers and clocks of the other transceivers of FIG. 5 operate similarly as noted above with respect to transceiver 510A, and contain corresponding transmitter and receiver blocks.

Each of duplexers 520A through 520N enables transmission and reception of the respective transmitted and received signal (i.e., bi-directional (duplex) communication) over the single path between the corresponding duplexer and combiner 530. Each of duplexers 520A through 520N may be implemented with two band-pass filters connected in parallel, with one filter providing a path between the corresponding transmitter and combiner 530, and the other filter providing a path between combiner 530 and the corresponding receiver.

Combiner 530 combines the signals from/to the transceivers 510A through 510N to enable transmission and reception of all the signals using a single antenna 540.

Antenna 540 operates to receive from, and transmit to, a wireless medium, information-bearing wireless signals between the transceivers and wireless user equipment.

The implementation and use of bias block 200 solves the problems noted with respect to some prior bias blocks (e.g., prior bias block 10), at least for reasons explained above. In particular, due to its low impedance at DC, bias block 200 can provide the additional gate-leakage current required by the transistor that is biased. The new bias block provides high impedance at RF without any series element between the bias block and the amplifier and the consequent problems noted above. The new bias block can also be tuned to provide a non-linear impedance to the signal path, which in turn can be used to improve the non-linearity of the circuit (e.g., LNA) that uses the new bias block.

While the description above is provided with respect to pHEMT transistor, it must be understood that other types of transistors can also be used instead of pHEMT with/without corresponding changes to the circuits as will be apparent to a skilled practitioner by reading the disclosure provided herein In general, any transistor which is a 'voltage-controlled current-source' type of device and has a gate-to-source diode (such as 410), inherently present within the transistor or added external to the transistor, can be used in place of Q3 in particular, and each of the transistors of bias block 200 in general. If cancellation or mitigation of non-linearity of a device/circuit (such as an LNA) biased by the bias block is not desired, then any transistor which is a 'voltage-controlled current-source' type of device is sufficient. Further, the circuits/blocks using the transistors can also be implemented to handle wireline signals (rather than, or in addition to, RF/wireless signals)

6. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1 through 5, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as pHEMT, N-type, P-type, etc.) noted above are merely by way of illustration. However, alternative embodiments using different configurations and transistors will be apparent to one skilled in the relevant arts by reading the disclosure provided herein. For example, the N-type transistors may be replaced with P-type transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A bias block for providing a bias voltage at a bias node to a first transistor, said bias block comprising:
   a first impedance;
   a second transistor having a control terminal, a first current terminal and a second current terminal, wherein a voltage level at said control terminal determines a magnitude of current flowing between said first current terminal and said second current terminal,
   said first current terminal being coupled to a supply voltage via said first impedance; and
   a second impedance coupled between said second terminal and a constant reference potential,
   wherein a junction of said second current terminal and said second impedance is said bias node providing said bias voltage to said first transistor,
   wherein said bias block further comprises:
   a first capacitor coupled between said control terminal and said second current terminal.

2. The bias block of claim 1, wherein said first current terminal is a drain terminal, said second current terminal is a source terminal, and said control terminal is a gate terminal.

3. The bias block of claim 1, wherein each of said first transistor and said second transistor is a pseudo High Electron Mobility Transistor (pHEMT).

4. The bias block of claim 2, further comprising:
   a third transistor having a drain terminal coupled to said supply voltage via a temperature-compensation block, and a source terminal coupled to said constant reference potential;
   a fourth transistor having a drain terminal coupled to said supply voltage via a fourth impedance, and a source terminal coupled to said constant reference potential via a fifth impedance, wherein a control terminal of said third transistor is coupled to said source terminal of said fourth transistor,
wherein a drain terminal of said third transistor is coupled to the control terminal of said second transistor.

5. The bias block of claim 4, further comprising a second capacitor coupled between said drain terminal of said third transistor and said constant reference potential.

6. The bias block of claim 5, wherein said temperature-compensation block comprises:
a sixth impedance, a seventh impedance and a diode,
wherein a series combination of said sixth impedance and said seventh impedance is coupled between said supply voltage and said drain terminal of said third transistor,
wherein an anode terminal of said diode is coupled to said supply voltage, and a cathode terminal of said diode is coupled to a junction of said sixth impedance and said seventh impedance.

7. The bias block of claim 2, wherein said first capacitor has a non-linear capacitance that enables pre-distortion of a signal applied at said junction,
wherein said pre-distortion is designed to cancel non-linearity of a circuit when said circuit is biased by said bias voltage.

8. The bias block of claim 2, wherein said first capacitor causes said bias block to present a high impedance to a high-frequency signal applied at said junction.

9. The bias block of claim 2, wherein providing of said bias voltage at said source terminal of said second transistor causes said bias block to present a low impedance at DC at said junction,
wherein said junction provides a leakage current of said first transistor.

10. A circuit comprising:
an amplifier comprising a first transistor, said first transistor having a first control terminal, a first current terminal and a second current terminal, said first control terminal being designed to receive a bias voltage and an input signal of time-varying magnitude, said first transistor to amplify said input signal to generate an amplified signal when said bias voltage is of a fixed magnitude; and
a bias block to generate said bias voltage at said first control terminal for said amplifier, wherein said bias block comprises:
a first impedance;
a second transistor having a second control terminal, a third current terminal and a fourth current terminal, wherein a voltage level at said second control terminal of said second transistor determines a magnitude of current flowing between said third current terminal of said second transistor and said fourth current terminal of said second transistor,
said third current terminal of said second transistor being coupled to said a supply voltage via said first impedance; and
a second impedance coupled between said fourth terminal and a constant reference potential,
wherein a junction of said fourth current terminal of said second transistor and said second impedance is said bias node providing said bias voltage.

11. The circuit of claim 10, wherein said amplifier further comprises:
a load coupled between said supply voltage and said first current terminal, and
a source impedance coupled between said second current terminal and said constant reference potential, wherein said first transistor is a pseudo High Electron Mobility Transistor (pHEMT),
wherein said first transistor provides said amplified signal at said first current terminal of said first transistor,
wherein said bias block further comprises:
a first capacitor coupled between said second control terminal of said second transistor and said fourth current terminal of said second transistor.

12. The circuit of claim 11, wherein said third current terminal is a drain terminal, said fourth current terminal is a source terminal, and said second control terminal is a gate terminal,
wherein said second transistor is a pseudo High Electron Mobility Transistor (pHEMT),
wherein said amplifier is a low-noise amplifier (LNA) and each of said input signal and said amplified signal are radio-frequency (RF) signals.

13. The circuit of claim 12, wherein said bias block further comprises:
a third transistor having a drain terminal coupled to said supply voltage via a temperature-compensation block, and a source terminal coupled to said constant reference potential;
a fourth transistor having a drain terminal coupled to said supply voltage via a fourth impedance, and a source terminal coupled to said constant reference potential via a fifth impedance,
wherein a control terminal of said third transistor is coupled to said source terminal of said fourth transistor,
wherein a drain terminal of said third transistor is coupled to the control terminal of said second transistor.

14. The circuit of claim 13, wherein said bias block further comprises a second capacitor coupled between said drain terminal of said third transistor and said constant reference potential
wherein said temperature-compensation block comprises:
a sixth impedance, a seventh impedance and a diode,
wherein a series combination of said sixth impedance and said seventh impedance is coupled between said supply voltage and said drain terminal of said third transistor,
wherein an anode terminal of said diode is coupled to said supply voltage, and a cathode terminal of said diode is coupled to a junction of said sixth impedance and said seventh impedance.

15. The circuit of claim 11, wherein said first capacitor has a capacitance value that enables pre-distortion of a signal applied at said junction,
wherein said pre-distortion is designed to cancel non-linearity of said amplifier.

16. A system comprising:
an antenna; and
a first transceiver comprising a transmitter portion and a receiver portion each coupled to said first duplexer, said first transceiver to transmit communication signals to a wireless medium via said first duplexer and said antenna, said first transceiver to also receive communication signals from said wireless medium via said first duplexer and said antenna,
wherein said receiver portion comprises:
a low-noise amplifier (LNA) comprising a first transistor, said first transistor having a first control terminal, a first current terminal and a second current terminal, said first control terminal being designed to receive a bias voltage, and an input signal of time-varying magnitude comprised in said communication signals, said first transistor to amplify said input signal to generate an amplified signal when said bias voltage is of a fixed magnitude; and
a bias block to generate said bias voltage at said first control terminal for said LNA,
wherein said bias block comprises:
  a first impedance;
  a second transistor having a second control terminal, a third current terminal and a fourth current terminal, wherein a voltage level at said second control terminal of said second transistor determines a magnitude of current flowing between said third current terminal of said second transistor and said fourth current terminal of said second transistor,
  said third current terminal of said second transistor being coupled to a supply voltage via said first impedance; and
  a second impedance coupled between said second terminal and a constant reference potential,
  wherein a junction of said fourth current terminal of said second transistor and said second impedance is said bias node providing said bias voltage.

17. The system of claim 16, wherein said amplifier further comprises:
  a load coupled between said supply voltage and said first current terminal, and
  an impedance coupled between said second current terminal and said constant reference potential,
  wherein said first transistor is a pseudo High Electron Mobility Transistor (pHEMT),
  wherein said bias block further comprises:
    a first capacitor coupled between said second control terminal of said second transistor and said fourth current terminal of said second transistor.

18. The system of claim 17, wherein said third current terminal, said fourth current terminal and said second control terminal of said second transistor are respectively a drain terminal, a source terminal, and a gate terminal,
  wherein said second transistor is a pseudo High Electron Mobility Transistor (pHEMT),
  wherein said bias block further comprises:
    a third transistor having a drain terminal coupled to said supply voltage via a temperature-compensation block, and a source terminal coupled to said constant reference potential;
    a fourth transistor having a drain terminal coupled to said supply voltage via a fourth impedance, and a source terminal coupled to said constant reference potential via a fifth impedance,
    wherein a control terminal of said third transistor is coupled to said source terminal of said fourth transistor,
    wherein a drain terminal of said third transistor is coupled to the control terminal of said second transistor.

19. The system of claim 18, wherein said bias block further comprises a second capacitor coupled between said drain terminal of said third transistor and said constant reference potential
  wherein said temperature-compensation block comprises:
    a sixth impedance, a seventh impedance and a diode,
    wherein a series combination of said sixth impedance and said seventh impedance is coupled between said supply voltage and said drain terminal of said third transistor,
    wherein an anode terminal of said diode is coupled to said supply voltage, and a cathode terminal of said diode is coupled to a junction of said sixth impedance and said seventh impedance,
  wherein said first capacitor has a non-linear capacitance value that enables pre-distortion of a signal applied at said junction,
  wherein said pre-distortion is designed to cancel non-linearity of said amplifier.

* * * * *